Figure 1:
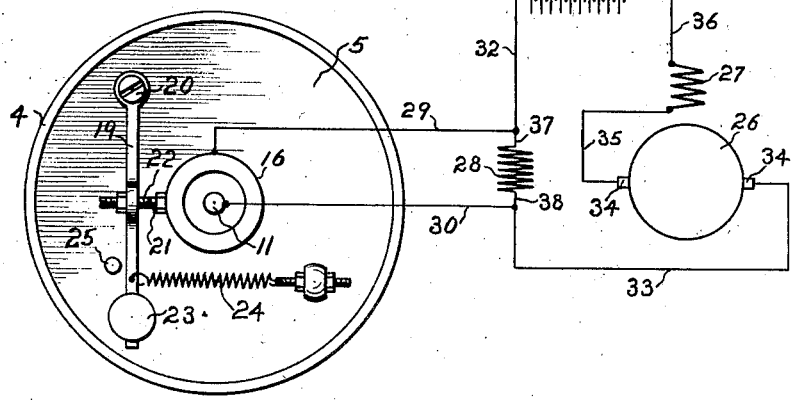

Aug. 4, 1925.

J. A. OBERMAIER

GOVERNOR

Filed Aug. 7, 1922

1,548,479

Witness:
Richard J. Jacker

Inventor:
John A. Obermaier

Patented Aug. 4, 1925.

1,548,479

UNITED STATES PATENT OFFICE.

JOHN A. OBERMAIER, OF CHICAGO, ILLINOIS, ASSIGNOR TO J. W. DANA, OF KANSAS CITY, MISSOURI.

GOVERNOR.

Application filed August 7, 1922. Serial No. 580,097.

*To all whom it may concern:*

Be it known that I, JOHN A. OBERMAIER, a citizen of the United States, residing at Chicago, in the county of Cook and State of Illinois, have invented a new and useful Governor, of which the following is a specification.

My invention relates to governors for maintaining constant the speed of an electric motor.

In measuring and indicating instruments, it is often necessary to provide a shaft rotating at constant speed or a member moving at a constant speed for the purpose of giving an indication or of making a record. Particularly in making a record where the record extends over a period of time and the accuracy of the record depends upon the constancy of the speed of motion, it is highly desirable to provide means for securing a close regulation of the speed of the motor.

In accordance with my invention I provide a centrifugal controlled switch which is in a state of agitation between closing and opening position, which results in an exceedingly close regulation of the speed.

In controlling the electric motor, I employ preferably a resistance which is cut into circuit by the opening of the governor contact and which is cut out of circuit by the closing of the governor contact, the opening of the contact corresponding to a speed slightly in excess of the desired speed and the closing of the contact corresponding to a speed slightly under the predetermined speed. This resistance being cut into and out of circuit corresponds to a lowering and raising of the voltage on the circuit and the motor is so arranged to be affected by this change in voltage as to have its speed decreased or increased, as the case may be.

In the particular governor which is herein described and illustrated in detail, I employ a pendulum or weighted arm secured to a rotating part, this pendulum or weighted arm having a spring tension device tending to hold it in closed position. The frequency of the pendulum depends upon a number of variables; first, the length of the arm; second, the mass of the weight, and third, the distance from the central position, that is, the radial position of the mass, and finally, the spring tension which tends to oppose movement.

The force required to open the contact is exceedingly slight, but the force which is developed upon exceeding a predetermined speed is relatively great since the force tending to move the mass is a function of the mass and the square of the velocity, and is inversely proportional to the radius of curvature of the path.

The swinging arm is, in effect, a pendulum, and it tends to have a natural frequency, but this natural frequency is modified by the centrifugal force and the spring tension opposing it. The result is a vibratory system of high frequency which cuts in and out the controlling resistance in such a manner as to maintain the resulting average speed substantially constant with a high degree of accuracy.

Incidentally, the particular form of governor which I have provided is substantially self-contained, simple and inexpensive, and is easily adjusted and permanent in its adjustment. It is further characterized by a minimum of mechanical motion, and consequently, minimum wear.

In order to acquaint those skilled in the art with the manner of constructing one form of my invention, I shall now describe in connection with the accompanying drawings a specific embodiment thereof.

Figure 2:
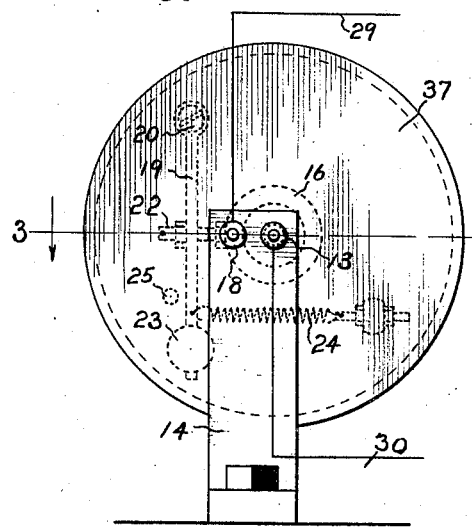
Figure 3:
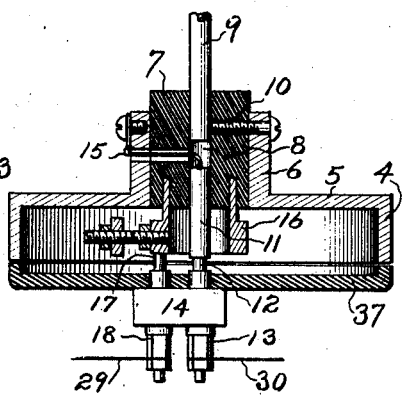

Figure 1, is an end view of a governor embodying my invention showing electric connections diagrammatically to a motor; Fig. 2, is an end view of the governor with the contacts in position; and Fig. 3, is a sectional view taken on line 3—3 of Fig. 2.

Similar reference characters refer to similar parts throughout the several views.

The casing 4, is of cylindrical form open on one end and closed at the other end by wall 5, which has the central hub 6, extending therefrom. The hub 6, is provided with a central core 7, made of electrical insulation material and provided with a concentric hole 8, in one end of which the motor shaft 9 may be secured by means of the set screw 10. In the other end of the hole 8 is secured a metal shaft 11 whose free end extends into the hollow portion of the casing 4 with its end engaging the contact brush 12. The brush 12 is mounted on the binding post 13 which is secured in the upright 14 made of electrical insulation material. A suitable electrical connection is formed between the shaft 11 and the hub 6 of the casing 4 by means of the wire 15. A metallic ring 16 is mounted within the casing 4 about the shaft 11 and is secured to the insulation block 7 to be electrically insulated from the casing 4 and contacted by the brush 17 mounted on the binding post 18 secured in the insulation upright 14. Within the casing 4 is a swinging arm 19 pivotally mounted to the wall 5 at 20 to swing toward and away from the ring 16. The ring 16 is provided with a contact 21 to register and engage the contact 22 provided on the arm 19. The arm 19 is preferably provided with a weight 23 and is yieldingly held toward the ring 16 by a spring 24. It will be noted that the arm 19 swings about an axis which is parallel with the axis of motor shaft 9, and as the motor shaft rotates together with the casing 4 the centrifugal force will tend to swing the free end of arm 19 away from the ring 16 against the tension of spring 24, and when this centrifugal force becomes sufficient to overcome the tension of the spring the contacts 21 and 22 will be disconnected. A stop 25 is provided to limit the movement of the arm 19 in a direction away from the ring 16.

As shown in Fig. 1, the motor 26 has its field 27 connected in series in the line supplying the electric current, and a resistance 28 is placed in the line at any convenient point. A conductor 29 forms electrical connection between the line on one side of resistance 28 with the ring 16 and the conductor 30 forms electrical connection between the line on the other side of resistance 28 with the shaft 11. The conductor 29 is attached to the binding post 18 and the conductor 30 is attached to the binding post 13.

In operation one side of the source of electric power 31 is connected by conductor 32 and conductor 29 to binding post 18 from whence the current travels through brush 17, ring 16, contact 21, contact 22, arm 19, pivot 20, casing 4, conductor 15, shaft 11, brush 12, binding post 13, conductor 30, conductor 33, motor brushes 34, conductor 35, coil of field 27, and thence through conductor 36 back to source of power 31. When the motor 26 rotates sufficiently fast to cause the arm 19 to swing on its pivot to separate the contacts 21 and 22 the circuit will still be completed from conductor 32, through conductor 37, resistance 28, conductor 38 and thence to conductor 33, which circuit includes the resistance 28 and will cause the motor to rotate with less speed. Thus the swinging of arm 19 which is controlled by the speed of the motor will control the speed of the motor by constantly cutting out and cutting in the resistance 28. In some instances the resistance 28 may be eliminated and yet the motor would be controlled in speed by the mechanism described.

The upright support 14 may be formed with a circular part 37 to serve as a cover for the casing 4 to prevent any foreign matter lodging within the casing.

It will be understood that the size, shape and arrangement of the parts may be changed without in the least departing from the scope of my invention.

Having thus fully described my invention what I claim as new and desire to secure by Letters Patent of the United States is:

1. In a device of the class described, a cylindrical casing provided with a concentrically perforated electric insulation block for attaching to a motor shaft, and mechanism within the confines of said casing for making and breaking an electric circuit comprising a centrally disposed contact and a second contact in the form of a ring surrounding said first named contact, said contact being mounted on said insulation block and an arm mounted on a pivot whose axial line is parallel with the axial line of the axis of rotation of the casing.

2. In combination, a plate having a hollow hub, said hub being adapted to be secured to a motor shaft, a body of insulation mounted at the central part of the plate, a pair of concentric contacts on said body, a pair of governor contacts connected to said contacts, a fly ball governor adapted on excessive speed to open said governor contact, and a pair of stationary brush members cooperating with said contacts.

3. In a governor, a sleeve of insulation adapted to surround the motor shaft, a disk having a hub embracing said sleeve, a pair of concentric contacts having radial spaces, said contacts being mounted on said sleeve, a weighted governor arm pivoted to the disk, said arm having a contact, a cooperating stationary contact, and a spring tending to move the arm radially inward to hold the contacts in engagement, and stationary brushes cooperating with said concentric contacts.

4. In combination, a sleeve of insulation, a disk having a hub embracing said sleeve, said sleeve being adapted to receive a motor shaft, a central contact mounted axially in said sleeve, a concentric ring contact also mounted on said sleeve, an insulating plate substantially coextensive with the radial plate, said insulating plate having a pair of stationary brushes, said brushes engaging said axial contact and said concentric contact, a governor contact extending from said ring laterally, a pivoted arm mounted on the disk, said arm having a contact to engage said laterally extending contact, and a spring for holding said latter contacts in engagement, said pivoted arm tending to move out under the influence of centrifugal force to open said latter contacts.

5. In combination, a sleeve of insulation having an axial bore adapted to receive the end of a motor shaft, a circular disk having a hub embracing said sleeve, a clamping screw extending through the hub and the sleeve and being adapted to engage the end of the motor shaft, a central axial contact adapted to be mounted in the opposite end of the sleeve, a conductor extending through the sleeve and connecting the hub and said central axial contact, a ring contact concentric with said central axial contact, a contact screw extending from the side of said ring contact, a pivoted governor arm mounted on the disk and adapted to move in a plane parallel with the disk, said governor arm having a contact adapted to engage with said contact screw, a spring for holding the governor contact and the contact screw in engagement and brushes cooperating with said central axial contact and with said ring contact.

In testimony whereof I have signed my name to this specification this 20th day of July, 1922, at Chicago, Illinois, in presence of a subscribing witness.

JOHN A. OBERMAIER.

Witness:
RICHARD J. JACKER.